`US010579516B2`

United States Patent
Li et al.

(10) Patent No.: US 10,579,516 B2
(45) Date of Patent: Mar. 3, 2020

(54) SYSTEMS AND METHODS FOR PROVIDING POWER-EFFICIENT FILE SYSTEM OPERATION TO A NON-VOLATILE BLOCK MEMORY

(71) Applicant: QUALCOMM INCORPORATED, San Diego, CA (US)

(72) Inventors: Yanru Li, San Diego, CA (US); Dexter Chun, San Diego, CA (US); William Kimberly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 15/457,899

(22) Filed: Mar. 13, 2017

(65) Prior Publication Data
US 2018/0260320 A1 Sep. 13, 2018

(51) Int. Cl.
*G06F 1/3287* (2019.01)
*G06F 12/02* (2006.01)
(Continued)

(52) U.S. Cl.
CPC ........ *G06F 12/0246* (2013.01); *G06F 1/3221* (2013.01); *G06F 1/3225* (2013.01); *G06F 1/3275* (2013.01); *G06F 1/3287* (2013.01); *G06F 9/5094* (2013.01); *G06F 13/1673* (2013.01); *G06F 13/4068* (2013.01); *G06F 9/5016* (2013.01); *G06F 2212/7201* (2013.01); *Y02D 10/14* (2018.01); *Y02D 10/151* (2018.01); *Y02D 10/22* (2018.01)

(58) Field of Classification Search
CPC ..... G06F 1/3225; G06F 1/3275; G06F 9/5094
See application file for complete search history.

(56) References Cited

U.S. PATENT DOCUMENTS 5,634,099 A 5/1997 Andrews et al.
5,828,856 A 10/1998 Bowes et al.
(Continued)

OTHER PUBLICATIONS

Anu M D et al., "Reducing CPU Loading through Data Buffering of ADCs Using DMA," Cypress Semiconductor Corp., Mar. 2012, pp. 1-20.
(Continued)

*Primary Examiner* — Prasith Thammavong
*Assistant Examiner* — Edmund H Kwong
(74) *Attorney, Agent, or Firm* — Smith Tempel Blaha LLC/Qualcomm (57) ABSTRACT

Systems, methods, and computer programs are disclosed for providing power-efficient file system operation to a non-volatile block memory. An exemplary embodiment of a system comprises a non-volatile block memory having a file system, a dynamic random access memory (DRAM), and a system on chip (SoC). The SoC comprises a central processing unit (CPU), one or more non-core processors, a DRAM controller, a data interface coupled to an off-chip processor, and a multi-host storage controller. The CPU allocates a storage buffer in the non-volatile block memory. The multi-host storage controller comprises a virtualized client interface for providing the non-core and off-chip processors with direct read/write file system access using the allocated storage buffer while the CPU and the DRAM are in a low power state.

30 Claims, 8 Drawing Sheets

(51) Int. Cl.
  *G06F 13/40*   (2006.01)
  *G06F 13/16*   (2006.01)
  *G06F 1/3234*  (2019.01)
  *G06F 1/3221*  (2019.01)
  *G06F 1/3225*  (2019.01)
  *G06F 9/50*    (2006.01)

(56) References Cited

U.S. PATENT DOCUMENTS

| | | |
|---|---|---|
| 8,949,486 B1 | 2/2015 | Kagan et al. |
| 9,098,491 B2 | 8/2015 | Gu et al. |
| 2012/0198030 A1 | 8/2012 | Wang et al. |
| 2014/0198116 A1* | 7/2014 | Veal .................... G11C 16/349 345/531 |
| 2014/0229657 A1 | 8/2014 | Karamov et al. |
| 2017/0046300 A1 | 2/2017 | Klein et al. |
| 2017/0147516 A1* | 5/2017 | De .......................... G06F 3/061 |
| 2017/0336854 A1* | 11/2017 | Roychowdhury ...... G06F 1/324 |

OTHER PUBLICATIONS

International Search Report and Written Opinion—PCT/US2018/018567—ISA/EPO—dated Jun. 5, 2018.

\* cited by examiner

SYSTEMS AND METHODS FOR PROVIDING POWER-EFFICIENT FILE SYSTEM OPERATION TO A NON-VOLATILE BLOCK MEMORY

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.). The SoC may be coupled to one or more volatile memory devices (e.g., dynamic random access memory (DRAM) and one or more non-volatile storage devices (e.g., flash storage) via high-performance data and control interface(s).

The flash storage may be used as an operating system (O/S) file system. Currently, the O/S running on the CPU is in charge of the file system and the flash storage device. Therefore, other subsystems (e.g., digital signal processors (DSPs) and off-chip processors) must go through the CPU for file system access, which has several disadvantages. The CPU becomes an overhead because it must execute code to perform the file system/storage processing, which contributes to CPU power consumption. Furthermore, the DRAM is used as an intermediate buffer for passing data between the CPU and other subsystems, which adds to system power consumption.

Accordingly, there is a need for improved systems and methods for enabling other subsystems to directly access non-volatile storage for file system operations with minimal involvement of the CPU and DRAM.

SUMMARY OF THE DISCLOSURE

Systems, methods, and computer programs are disclosed for providing power-efficient file system operation to a non-volatile block memory. An exemplary embodiment of a system comprises a non-volatile block memory having a file system, a dynamic random access memory (DRAM), and a system on chip (SoC). The SoC comprises a central processing unit (CPU), one or more non-core processors, a DRAM controller, a data interface coupled to an off-chip processor, and a multi-host storage controller. The CPU allocates a storage buffer in the non-volatile block memory. The multi-host storage controller comprises a virtualized client interface for providing the non-core and off-chip processors with direct read/write file system access using the allocated storage buffer while the CPU and the DRAM are in a low power state.

An exemplary embodiment of a method comprises a central processing unit (CPU) on a system on chip (SoC) allocating a storage buffer in a non-volatile block memory having a file system. A request is received from one of a non-core processor on the SoC and an off-chip processor to access the non-volatile block memory. In response to the request, the CPU prepares the file system data structure and the allocated storage buffer, and the CPU and a dynamic random access memory (DRAM) electrically coupled to the SoC entering a low power state. While the CPU and the DRAM are in the low power state, the allocated storage buffer is used to provide the non-core processor or the off-chip processor direct read/write access to the file system on the non-volatile block memory.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
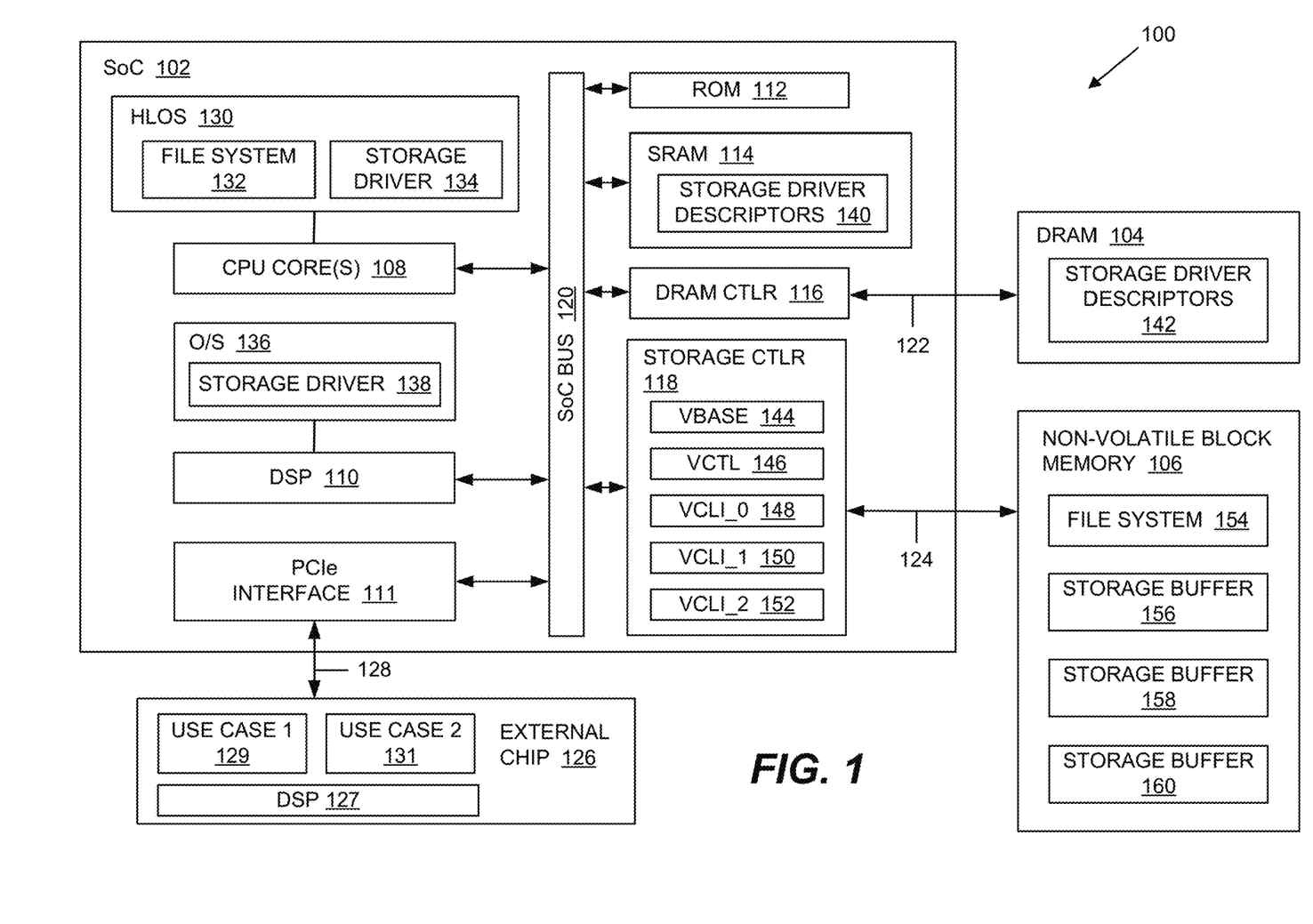
FIG. 1 is a block diagram of an embodiment of a system for providing power-efficient direct file system access to a non-volatile block memory.

FIG. 1 illustrates a system 100 comprising a system on chip (SoC) 102 electrically coupled to a volatile random access memory (VRAM) and a non-volatile storage device. The VRAM may comprise a dynamic random access memory (DRAM) 104. The non-volatile storage device may comprise a non-volatile block memory 106 comprising any type of high-performance non-volatile memory, including, for example, a flash memory, a phase-change memory, a ferroelectric memory, or a magnetoresistive memory. As described below in more detail, the system 100 enables processor subsystems (i.e., non-CPU-core SoC processors and/or off-chip processors) to directly access non-volatile block memory 106 for operations involving a file system 154 with minimal involvement of the CPU cores 108 and DRAM 104.

The system 100 may be implemented in any computing device, including a personal computer, a workstation, a server, a portable computing device (PCD), such as a cellular telephone, a smartphone, a portable digital assistant (PDA), a portable game console, a navigation device, a tablet computer, a wearable device, such as a sports watch, a fitness tracking device, etc., or other battery-powered, web-enabled devices.

The SoC 102 comprises various on-chip components, including one or more central processing unit (CPU) cores 108, a DRAM controller 116, static random access memory (SRAM) 114, read only memory (ROM) 112, a multi-host storage controller 118, one or more digital signal processors (DSPs) 110, and a serial data interface 111 interconnected via a SoC bus 120. Serial data interface 111 comprises a data interface for external chip(s) 126 electrically coupled to SoC 102. In an embodiment, the data interface supports a high-speed serial bus standard, such as, PCI Express (PCIe). External chip(s) 126 may comprise an external DSP 127 configured to support various functionalities or use cases (e.g., use cases 129 and 131).

The CPU core(s) 108 may execute a high-level operating system (HLOS) 130 for managing system hardware and software resources and providing common services for application programs. HLOS 130 comprises a file system 132 and a storage driver 134 that provides a software interface to non-volatile block memory 106. DSPs 110 may also execute a local O/S 136, which also includes a storage driver 138 for providing a software interface to non-volatile block memory 106.

It should be appreciated that various data structures may be involved in the storage operation. In an embodiment, the data structures involved in the storage operation may be viewed as three high-level categories. A first data structure category comprises storage descriptors for the storage operation. This data structure may be created by the storage driver 138, which provides information to the controller for the operation. The information may comprise, for example, a source location and length, a destination location, etc. In an embodiment, the storage descriptors may be stored in DRAM 104 (e.g., storage driver descriptors 142) or in on-chip RAM, such as SRAM 140 ((e.g., storage driver descriptors 140), which can be directly accessed by the storage controller hardware. A second data structure category comprises data in the non-volatile block memory 106, which may involve, for example, source data for a read operation or a destination for a write operation. A third data structure category involves data at the destination for the read operation and source data for the write operation. This data may be stored in DRAM 104 or SRAM 140, which can be directly accessed by a direct memory access (DMA) engine in storage controller hardware.

An exemplary method may use SRAM 114 to store storage driver descriptors 140. It may also be stored on the external chip 126 and accessed by the storage controller through a direct addressable chip-to-chip interface (e.g., PCIe interface 111). It should be appreciated that system power consumption may be reduced by allocating the storage driver descriptor(s) and the data associated with the third category of data structure in SRAM 114 (or on the external chip 126) instead of allocating the data in DRAM 104 or having to copy the external data into DRAM 104.

DRAM controller 116 manages the flow of data going to and from the DRAM 104 via a RAM bus 122. DRAM controller 116 generally comprises the logic for reading and writing to DRAM 104.

Multi-host storage controller 118 manages the flow of data going to and from the non-volatile block memory 106 via high-speed bus 124. Multi-host storage controller 118 provides input/output (I/O) virtualization. It should be appreciated that multi-host storage controller 118 may support existing host controller interface (HCI) specifications for managing memory-mapped I/O spaces, such as, for example, the Universal Flash Storage Host Controller Interface (UFSHCI) specification. As illustrated in FIG. 1, multi-host storage controller 118 may comprise various capability and operational register sets. A VBASE register set 144 may be used by boot and pre-O/S setup operations. A VCTL register set 146 may provide virtualization controls, such as, declaring virtualization capabilities, allocating resources to clients, access control, trap filters, and handling intercepted commands. VCLI register sets 148, 150, and 152 comprise virtualized client interfaces that are used by different client hosts. As an example, VCLI_0 148 may be used by CPU core(s) 108. VCLI_1 150 may be used by DSP 110. VCLI_2 152 may be used by the DSP 127 located on external chip 126. As further illustrated in FIG. 1, non-volatile block memory 106 may allocate one or more storage buffers 156, 158, and 160 for system operations involving file system 154.

Figure 2:
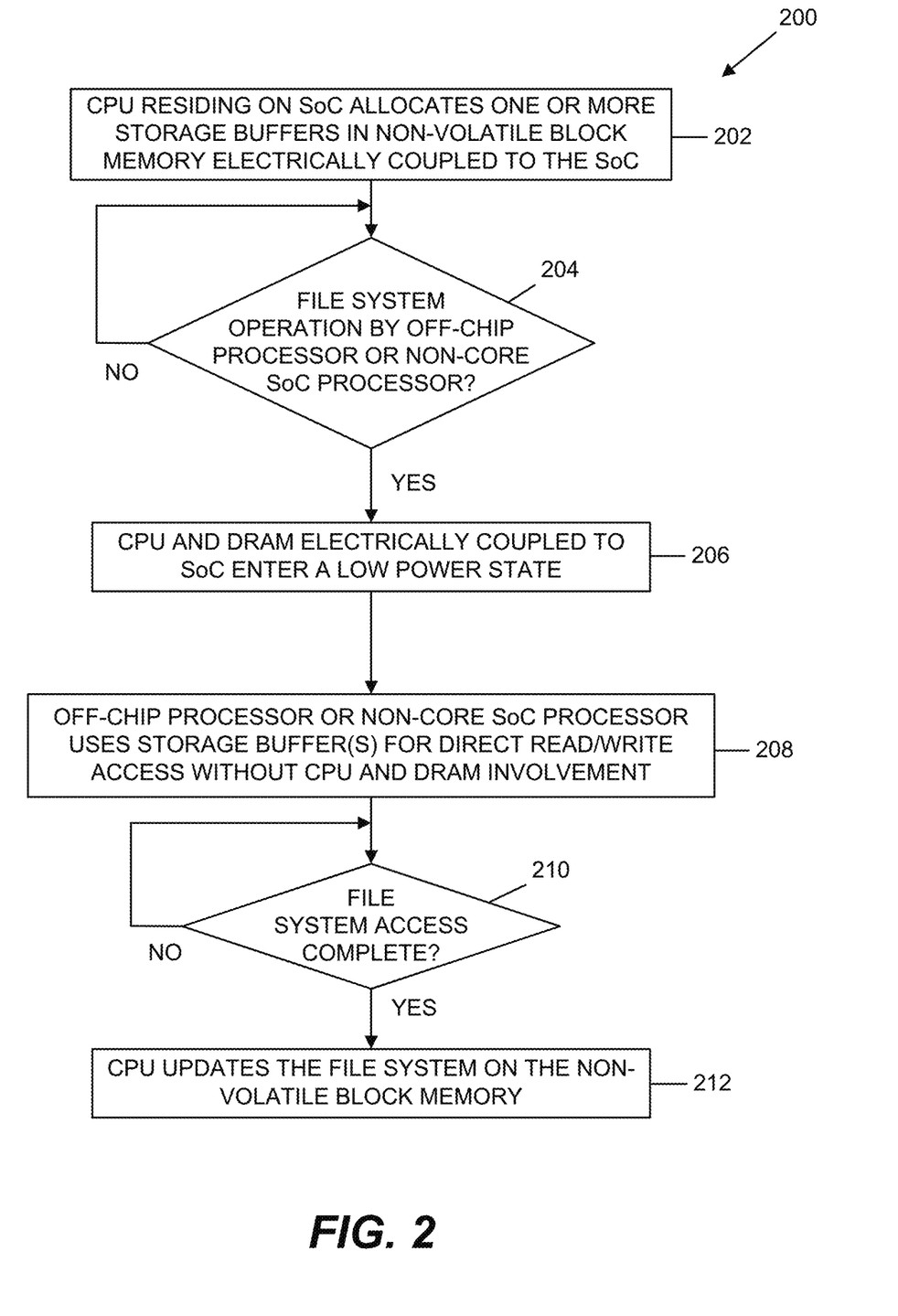
FIG. 2 is a flowchart illustrating an embodiment of a method implemented in the system of FIG. 1 for providing power-efficient direct file system access to a non-volatile block memory.
Figure 3A:
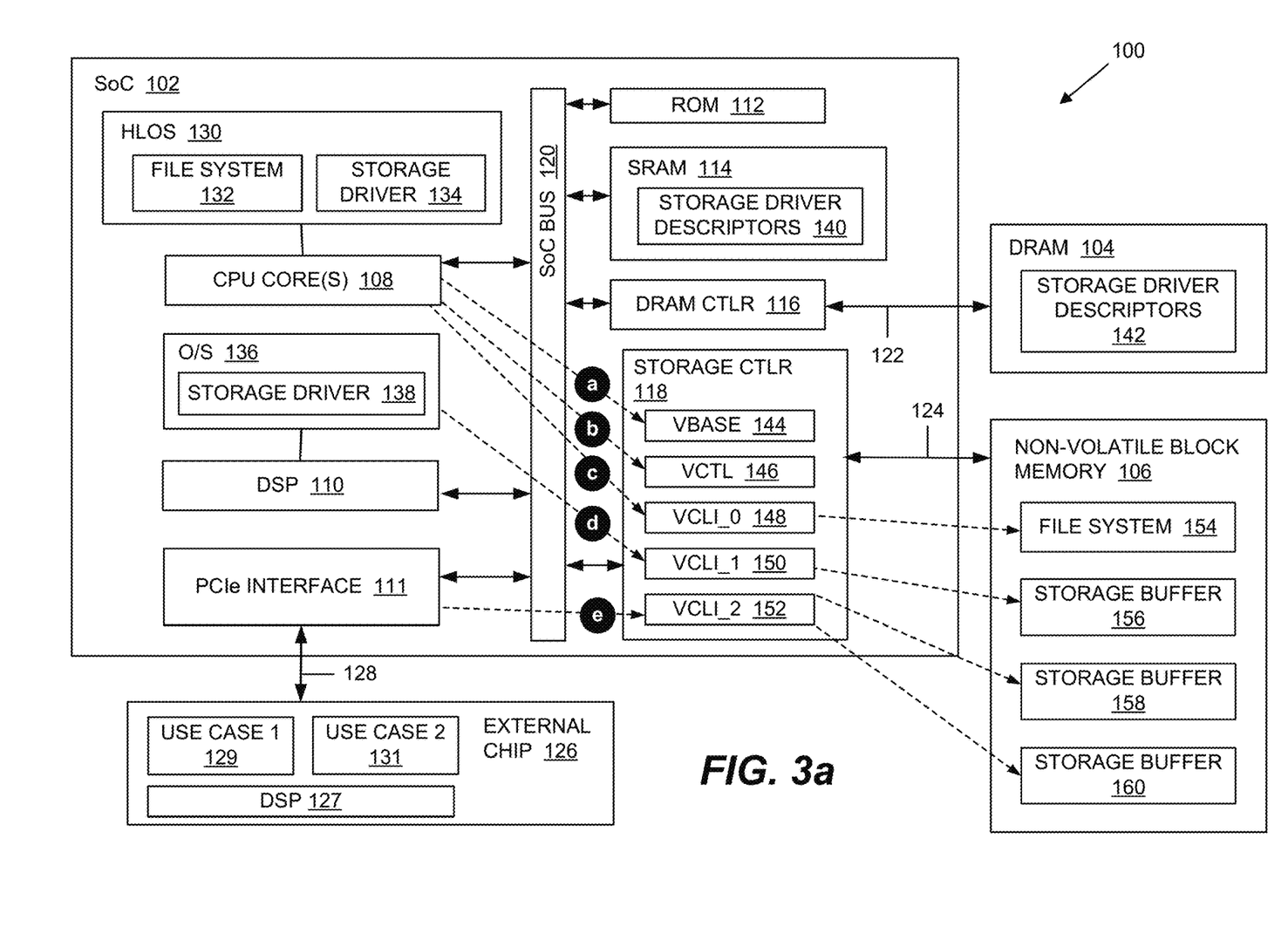
FIG. 3a illustrates the system of FIG. 1 during a storage buffer allocation phase.

FIG. 2 illustrates one exemplary method 200 implemented in the system 100 for providing power-efficient direct access to non-volatile block memory 106 during operations involving file system 154. At block 202, CPU core 108 on SoC 102 allocates one or more storage buffers in non-volatile block memory 106. As illustrated in FIG. 3a, a storage buffer 156 may be allocated to on-chip DSP 110. Storage buffers 158 and 160 may be allocated to off-chip DSP 127. It should be appreciated that various file system related use cases may operate concurrently. For example, storage buffer 158 may be allocated for use case 129, and storage buffer 160 may be allocated for use case 131. As further illustrated in FIG. 3a at reference letters a, b, and c, CPU core 108 interfaces with VBASE register set 144, VCTL register set 146, and VCLI_0 register set 148. VCLI_0 148 may be used by CPU core(s) 108 to update the file system 154. As shown by reference letter d, storage driver 138 on DSP 110 interfaces with VCTL_1 register set 150, which is assigned to storage buffer 156. As shown by reference letter e, PCIe interface 111 interfaces with VCTL_2 152, which is assigned to storage buffers 158 and 160.

Figure 3B:
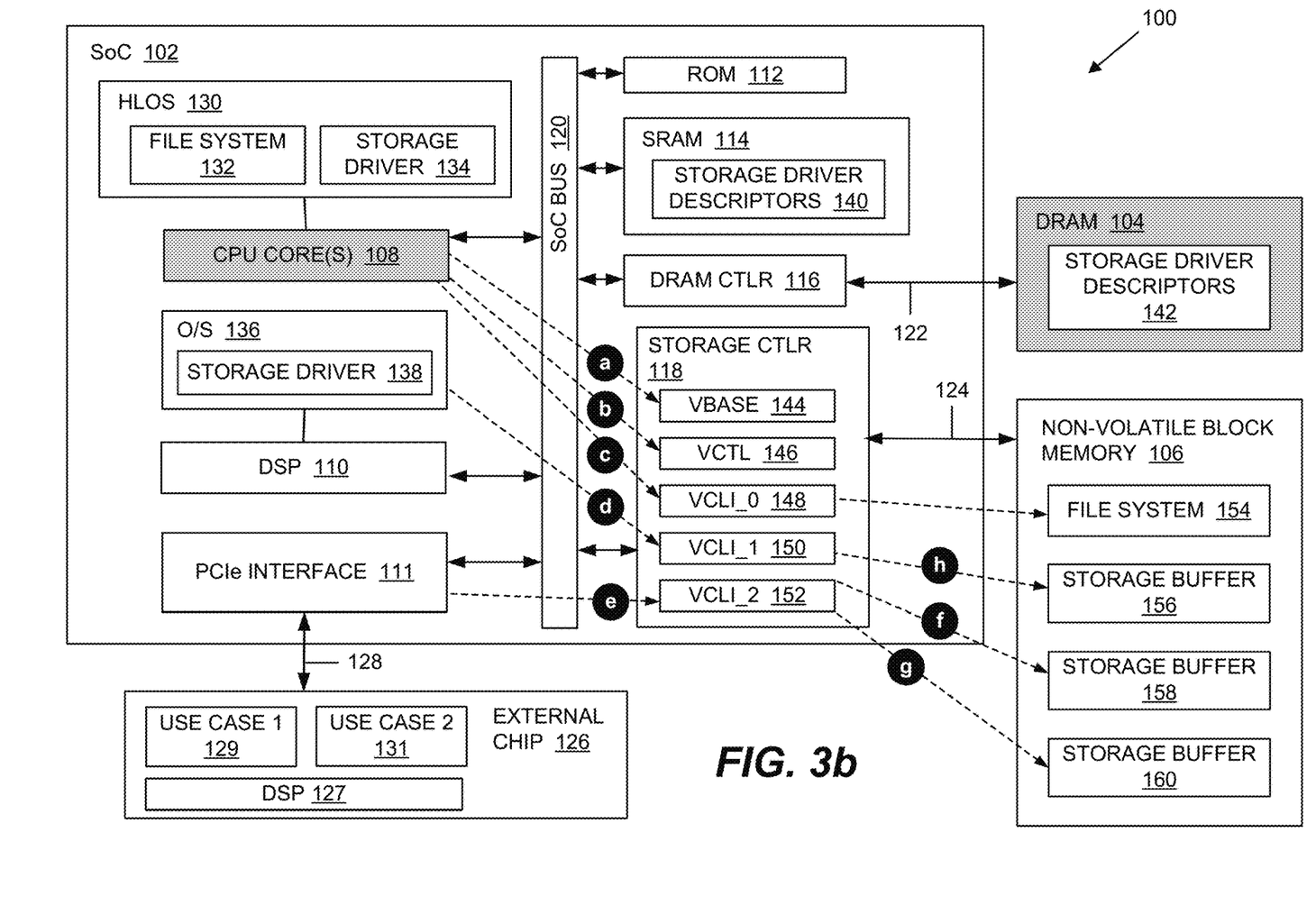
FIG. 3b illustrates the system of FIG. 1 during a direct file system access to the non-volatile memory block using the storage buffers while the CPU and DRAM are in a low power state.

Referring again to the method of FIG. 2, at decision block 204, an operation involving file system 154 may be requested by off-chip DSP 127 or a non-core, on-chip processor (e.g., DSP 110). By way of example, the file system access request may involve an application download, a file transfer, or a server backup/restore involving a modem. In response to the request, at block 206, the CPU core 108 may allocate a buffer in the non-volatile block memory 106, prepare a file system data structure, and then entered into a low power state if there is no task to be processed. At block 208, while the CPU 108 and the DRAM 104 are in the low power state, the allocated storage buffer(s) may be used to provide the non-core processor or the off-chip processor direct read/write access to the file system 154 on the non-volatile block memory 154. As illustrated in FIG. 3b, VCTL_1 150 may be used to control direct access (reference letter h) to storage buffer 156 if the request is from DSP 110. VCTL_2 152 may be used to control direct access (reference letters f and g) to storage buffers 158 or 160, respectively, if the request is from off-chip DSP 127. In FIG. 3b, CPU core 108 and DRAM 104 are greyed-out to indicate that they are placed in a low power state while direct access is being provided to reduce system power consumption.

Figure 3C:
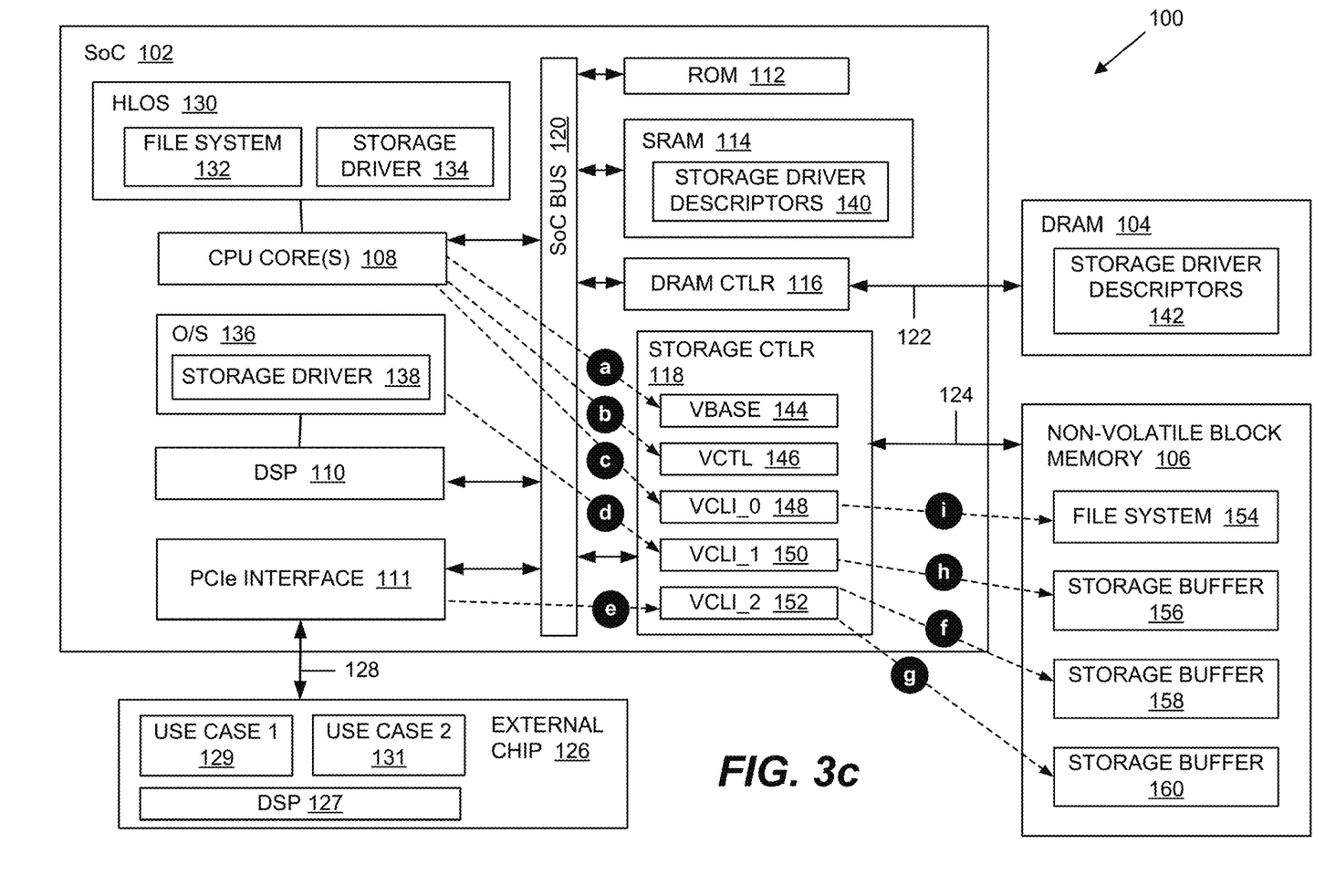
FIG. 3c illustrates the system of FIG. 1 during a file system update phase.

When file system access operations are complete (decision block 210), the use case may send a signal to the CPU to integrate the data into the file system, and the CPU 108 and DRAM 104 may then leave the low power state. At block 212, the CPU 108 may update the file system 154 on the non-volatile block memory 106 using the data contained in the corresponding storage buffer. Reference letter i in FIG. 3c illustrates VCTL_0 148 updating the file system 154 with the CPU core 108 and DRAM no longer being greyed-out to illustrate these components no longer being in the low power state.

Figure 4:
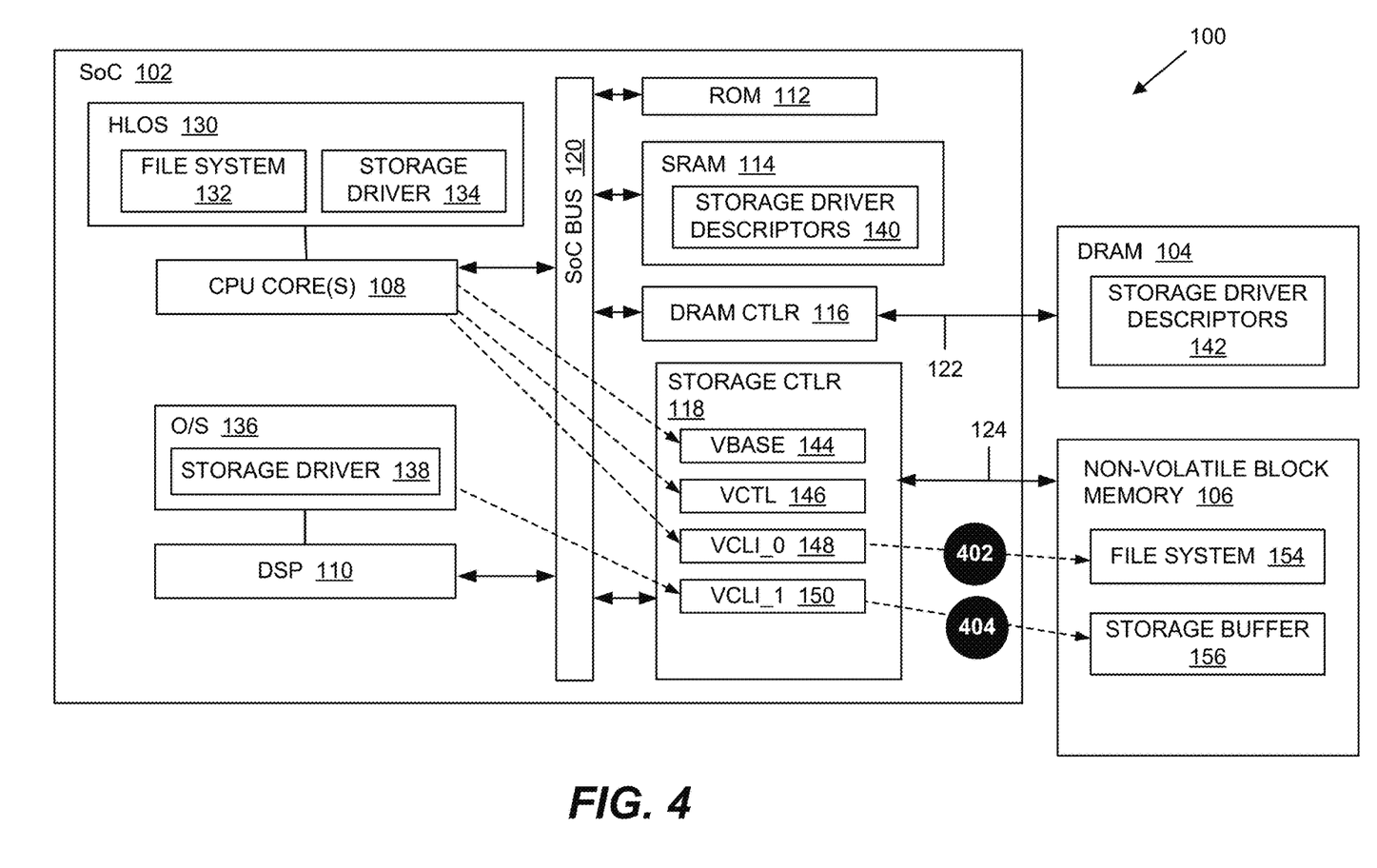
FIG. 4 illustrates an exemplary implementation of a fixed, carve-out buffer in the system of FIG. 1.

It should be appreciated that the allocation of the storage buffers may be performed in various ways. In the embodiment illustrated in FIG. 4, the allocated storage buffer may comprise a fixed, carve-out buffer. For example, HLOS 130 may pre-allocate a carve-out of fixed logical block addresses (LBA) in non-volatile memory 106. Access from DSP 110 or external chip 126 may write to the corresponding assigned storage buffer 156. CPU 108 may be in a low power state when DSP 110 operates on non-volatile block memory 106. FIG. 4 illustrates the example in which access is from DSP 110. In this example, the storage driver 138 on DSP 110 may comprise a direct memory access (DMA) driver to provide high bandwidth operation. At reference numeral 402 in FIG. 4, the file system 154 may be updated by the HLOS storage driver 134 residing on the CPU 108. It should be appreciated that HLOS storage driver has information about the available logical block address used to refer to the storage address that the DSP storage driver 138 is/will be operating upon in reference numeral 404.

Existing non-volatile block devices 106 may comprise a function to migrate data within the device among the physical blocks without intervention from an SoC side storage controller 118 and without changing the logical block address (LBA) of the data. This function is known as back group operation for purposes such as wear leveling. It should be appreciated that a new function may be included to allow the SoC 102 to implement this mechanism by instructing the device to remap the physical block that holds the data. The physical blocks may be remapped from initial LBAs that the CPU assigned to the non-CPU use cases (e.g., storage buffers 156, 158 and 160) to the new LBAs that are under the CPU's control (e.g., file system 154). Furthermore, new available physical blocks to the storage buffers 156, 158, and 160 may be mapped with initial LBAs that the CPU assigned to the non-CPU use cases. Then, the HLOS file system driver may update the iNodes of the file system with the new LBA. It should be appreciated that this method may not be used for a system that has storage encryption where the encryption key is associated with the LBA in the non-volatile block memory because the LBA of the data may be changed in the process of remapping.

Figure 5:
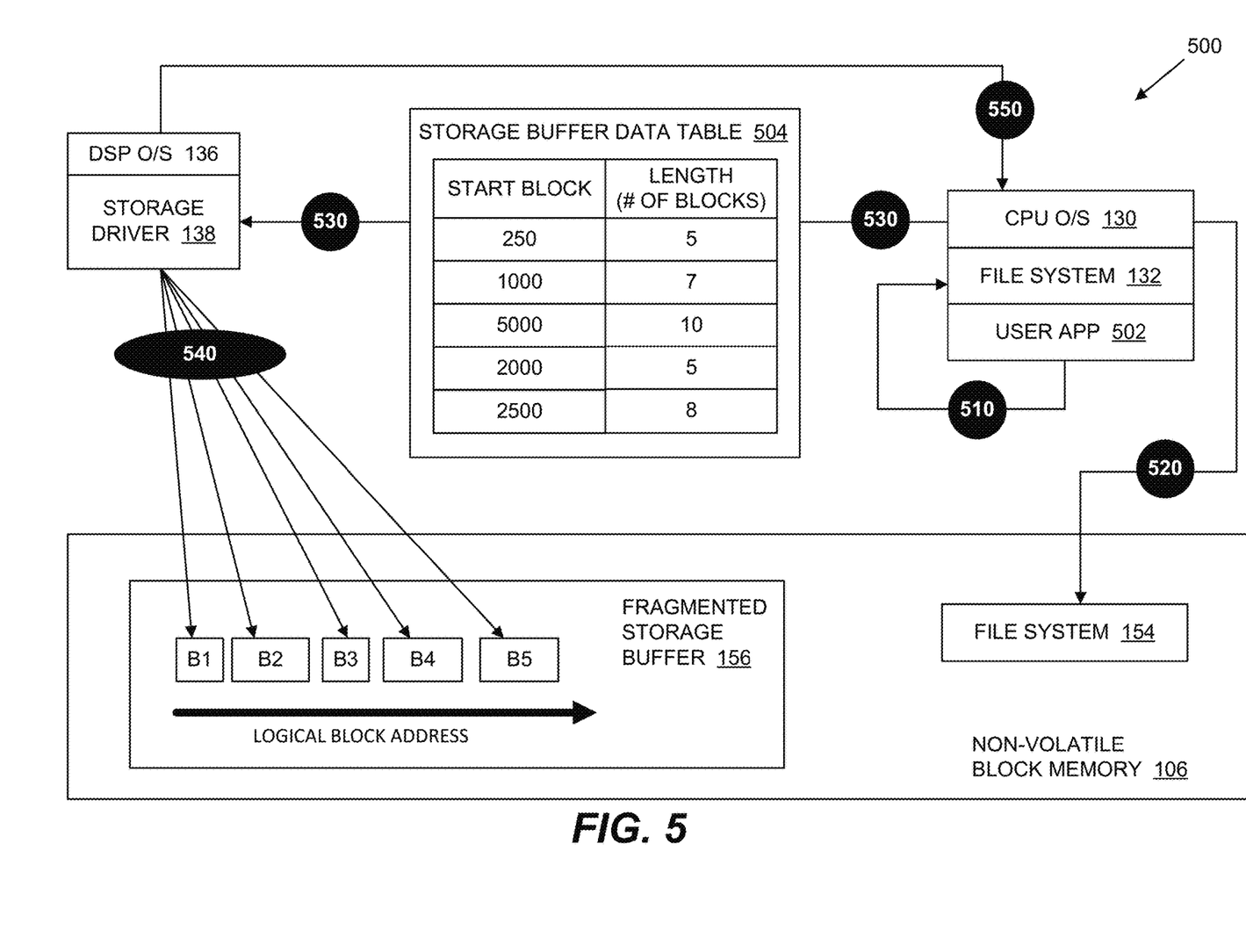
FIG. 5 is a block/flow diagram illustrating an exemplary embodiment of a runtime dynamic buffer allocation.

FIG. 5 illustrates another embodiment for implementing runtime dynamic buffer allocation. At reference numeral 510, a use case driver for a user application 502 may send a request to HLOS 130 for a certain file to be created/appended with a size parameter. At reference numeral 520, HLOS 130 opens the file, obtains a file handle, and allocates buffer(s) in non-volatile block memory 106. As illustrated in FIG. 5, an available logical block in the non-volatile block memory 106 may get fragments after use case allocation and deallocation. Storage driver 134 in the HLOS 130 may allocate the buffer in non-volatile block memory 106, comprised of a collection of fragmented buffers, B1, B2, . . . B5, added up to be a size of the request from the user application 502. File system 132 in the HLOS 130 may pre-construct the file system data structure with the allocated buffers although the buffer is not filled yet. It should be appreciated that existing HLOS file systems may be designed with data structure(s) that are capable of handling fragmentation in the storage device. The data structure may include a number of "extensions", which comprise the following: an "offset" variable to indicate the block offset within the file; a "starting block" variable to indicate the "offset" variable's corresponding LBA in the storage; and a "length" variable to indicate the length of the "extension".

The file system may initially mark the status of the extension as "invalid" to indicate that this the data structure content is empty. The systems and methods described herein may leverage the existing HLOS file system data structure design and enable a method to communicate buffer allocation based on it. At reference numeral 530, HLOS 130 may pass the buffer information to DSP 110, and allow direct access from a DSP use case to the storage, by configuring access control on the SoC 102 and the access control on the storage controller 118. In an embodiment, the HLOS 130 may construct the buffer information using the information from the "starting block" and "length" in the file system data structure. The buffer information may comprise a storage buffer data table 504 comprising a start block column and a length column. The start block column identifies a LBA, which reflects the "starting block" value in the file system data structure, and the length column identifies a number of blocks, which reflects the "length" value in the file system data structure. Each row in the table may represent one buffer in the storage (e.g., row one for B1 starting at LBA250 and a length of 5 blocks, row two for B2 starting at LBA 100 and a length of 7 blocks. After passing the buffer information, the CPU core(s) 108 and DRAM 104 may go into low power mode if there are no further tasks, while DSP 110 directly accesses the non-volatile block memory 106 on a file system related operation. At reference numeral 540, DSP 110 operates on the fragmented storage buffer 156. When the buffer is fully consumed or when the subsystem use case is complete, DSP 110 may send a ready signal back to HLOS 130 to initiate a file system update. HLOS 130 then takes back the access control from the DSP use case, and marks the status of the extension as "valid" to indicate that the content for the file system is in place. It should be appreciated that this method may be particularly advantageous in systems that have storage encryption wherein the encryption key is associated with the LBA in the non-volatile block memory because the data stays with the allocated LBA.

Figure 6:
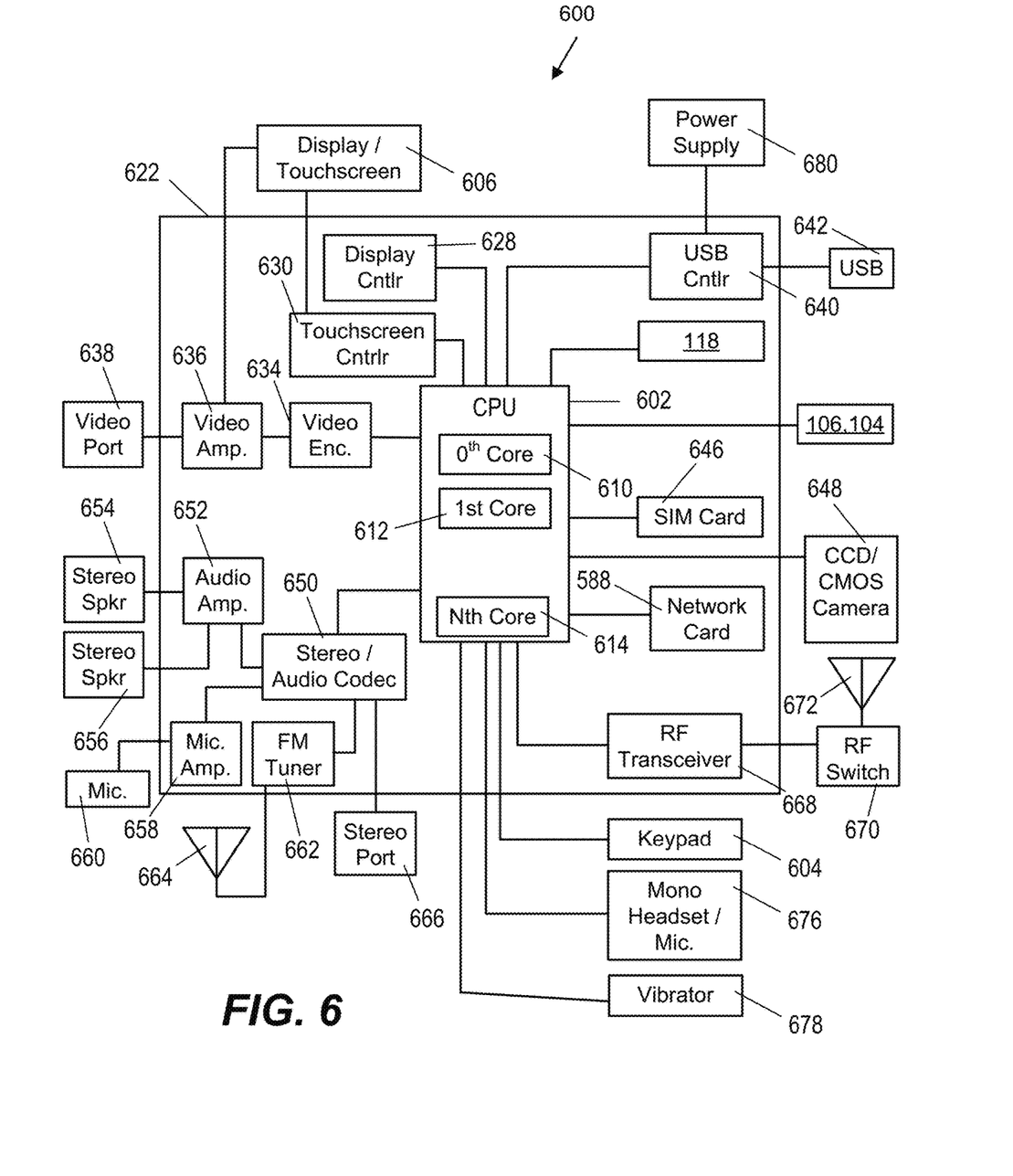
FIG. 6 is a block diagram of an embodiment of a portable computing device for incorporating the system of FIG. 1.

As mentioned above, the system 100 may be incorporated into any desirable computing system. FIG. 6 illustrates the system 100 incorporated in an exemplary portable computing device (PCD) 600. It will be readily appreciated that certain components of the system 100 are included on the SoC 622 (FIG. 6) while other components (e.g., the DRAM 104 and the non-volatile block memory 106) are external components coupled to the SoC 622. The SoC 622 may include a multicore CPU 602. The multicore CPU 602 may include a zeroth core 610, a first core 612, and an Nth core 614. One of the cores may comprise, for example, a graphics processing unit (GPU) with one or more of the others comprising the CPU.

A display controller 628 and a touch screen controller 630 may be coupled to the CPU 602. In turn, the touch screen display 606 external to the on-chip system 622 may be coupled to the display controller 628 and the touch screen controller 630.

FIG. 6 further shows that a video encoder 634, e.g., a phase alternating line (PAL) encoder, a sequential color a memoire (SECAM) encoder, or a national television system(s) committee (NTSC) encoder, is coupled to the multicore CPU 602. Further, a video amplifier 636 is coupled to the video encoder 634 and the touch screen display 606. Also, a video port 638 is coupled to the video amplifier 636. As shown in FIG. 6, a universal serial bus (USB) controller 640 is coupled to the multicore CPU 602. Also, a USB port 642 is coupled to the USB controller 640.

Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera.

As further illustrated in FIG. 6, a stereo audio coder-decoder (CODEC) 650 may be coupled to the multicore CPU 602. Moreover, an audio amplifier 652 may coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further illustrates that a radio frequency (RF) transceiver 668 may be coupled to the multicore CPU 602. An RF switch 670 may be coupled to the RF transceiver 668 and an RF antenna 672. A keypad 604 may be coupled to the multicore CPU 602. Also, a mono headset with a microphone 676 may be coupled to the multicore CPU 602. Further, a vibrator device 678 may be coupled to the multicore CPU 602.

FIG. 6 also shows that a power supply 680 may be coupled to the on-chip system 622. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

As depicted in FIG. 6, the touch screen display 606, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 may be external to the on-chip system 622.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing power-efficient file system operation to a non-volatile block memory, the method comprising:
   a central processing unit (CPU) on a system on chip allocating a storage buffer in a non-volatile block memory having a file system;
   receiving a request from one of a non-core processor on the SoC and an off-chip processor to access the non-volatile block memory;
   in response to the request, the CPU preparing a file system data structure and the allocated storage buffer, and the CPU and a dynamic random access memory electrically coupled to the SoC entering a low power state; and
   while the CPU and the DRAM are in the low power state, using the allocated storage buffer to provide the non-core processor or the off-chip processor direct read/write access to the file system on the non-volatile block memory.

2. The method of claim 1, wherein the allocated storage buffer in the non-volatile block memory comprises a pre-allocated, fixed carve-out buffer.

3. The method of claim 1, further comprising:
   in response to completing the read/write access, instructing the CPU and the DRAM to leave the low power state; and
   the CPU updating the file system on the non-volatile block memory using data contained in the allocated storage buffer.

4. The method of claim 1, wherein the CPU dynamically allocates the storage buffer during runtime.

5. The method of claim 4, wherein the CPU uses information from the file system data structure, provides a storage buffer data table to the non-core processor or the off-chip processor for accessing a fragmented storage buffer in the non-volatile block memory, and updates a status in file system data structure after the non-core processor or the off-chip processor use case is completed.

6. The method of claim 1, wherein the non-volatile block memory comprises a flash memory.

7. The method of claim 1, wherein the non-volatile block memory comprises one of a phase-change memory, a ferroelectric memory, and a magnetoresistive memory.

8. A system for providing power-efficient file system operation to a non-volatile block memory, the method comprising:
   means for allocating a storage buffer in a non-volatile block memory electrically coupled to a system on chip (SoC);
   means for receiving a request from one of a non-core processor on the SoC and an off-chip processor to access the non-volatile block memory;
   means for instructing, in response to the request, a central processing unit (CPU) on the SoC and a dynamic random access memory (DRAM) electrically coupled to the SoC to enter a low power state; and
   means for using the allocated storage buffer to provide the non-core processor or the off-chip processor direct read/write access to the file system on the non-volatile block memory while the CPU and the DRAM are in the low power state.

9. The system of claim 8, wherein the allocated storage buffer in the non-volatile block memory comprises a pre-allocated, fixed carve-out buffer.

10. The system of claim 8, further comprising:
    means for instructing, in response to completing the read/write access, the CPU and the DRAM to leave the low power state; and
    the CPU updating a file system on the non-volatile block memory using data contained in the allocated storage buffer.

11. The system of claim 8, wherein the means for allocating the storage buffer comprises the CPU, and the CPU dynamically allocates the storage buffer during runtime.

12. The system of claim 11, wherein the CPU provides a storage buffer data table to the non-core processor or the off-chip processor for accessing a fragmented storage buffer in the non-volatile block memory.

13. The system of claim 8, wherein the non-volatile block memory comprises a flash memory.

14. The system of claim 8, wherein the non-volatile block memory comprises one of a phase-change memory, a ferroelectric memory, and a magnetoresistive memory.

15. A computer program embodied in a non-transitory computer readable medium and executable by a processor for providing power-efficient file system operation to a non-volatile block memory, the computer program comprising logic configured to:

allocate a storage buffer in a non-volatile block memory electrically coupled to a system on chip (SoC);

receive a request from one of a non-core processor on the SoC and an off-chip processor to access the non-volatile block memory;

in response to the request, instruct a central processing unit (CPU) on the SoC and a dynamic random access memory (DRAM) electrically coupled to the SoC to enter a low power state; and while the CPU and the DRAM are in the low power state, use the allocated storage buffer to provide the non-core processor or the off-chip processor direct read/write access to the file system on the non-volatile block memory.

16. The computer program of claim 15, wherein the allocated storage buffer in the non-volatile block memory comprises a pre-allocated, fixed carve-out buffer.

17. The computer program of claim 15, further comprising logic configured to:

instruct the CPU and the DRAM to leave the low power state upon completion of the read/write access by the non-core processor or the off-chip processor; and update a file system on the non-volatile block memory using data contained in the allocated storage buffer.

18. The computer program of claim 15, wherein the CPU dynamically allocates the storage buffer during runtime.

19. The computer program of claim 18, wherein the CPU provides a storage buffer data table to the non-core processor or the off-chip processor for accessing a fragmented storage buffer in the non-volatile block memory.

20. The computer program of claim 15, wherein the non-volatile block memory comprises a flash memory.

21. The computer program of claim 15, wherein the non-volatile block memory comprises one of a phase-change memory, a ferroelectric memory, and a magnetoresistive memory.

22. A system for providing power-efficient file system operation to a non-volatile block memory, the system comprising:

a non-volatile block memory having a file system;

a dynamic random access memory (DRAM); and a system on chip (SoC) comprising a central processing unit (CPU), one or more non-core processors, a DRAM controller, a data interface coupled to an off-chip processor, and a multi-host storage controller, the CPU allocating a storage buffer in the non-volatile block memory, and the multi-host storage controller comprising a virtualized client interface for providing the non-core and off-chip processors with direct read/write file system access using the storage buffer while the CPU and the DRAM are in a low power state.

23. The system of claim 22, wherein the allocated storage buffer in the non-volatile block memory comprises a pre-allocated, fixed carve-out buffer.

24. The system of claim 22, wherein the CPU updates the file system on the non-volatile block memory using data contained in the allocated storage buffer.

25. The system of claim 22, wherein the CPU dynamically allocates the storage buffer during runtime.

26. The system of claim 25, wherein the CPU provides a storage buffer data table to the non-core processor or the off-chip processor for accessing a fragmented storage buffer in the non-volatile block memory.

27. The system of claim 22, wherein the non-volatile block memory comprises a flash memory.

28. The system of claim 22, wherein the non-volatile block memory comprises one of a phase-change memory, a ferroelectric memory, and a magnetoresistive memory.

29. The system of claim 22 incorporated in a portable computing device.

30. The system of claim 22, wherein the portable computing device comprises one of a smartphone, a tablet computer, and a portable gaming device.

* * * * *